US011605985B2

(12) United States Patent
Russell et al.

(10) Patent No.: US 11,605,985 B2
(45) Date of Patent: Mar. 14, 2023

(54) WIRELESS POWER SYSTEM WITH OBJECT DETECTION

(71) Applicant: Apple Inc., Cupertino, CA (US)

(72) Inventors: Antoin J. Russell, San Francisco, CA (US); Jukka-pekka J. Sjoeroos, Cupertino, CA (US); Zaki Moussaoui, San Carlos, CA (US)

( * ) Notice: Subject to any disclaimer, the term of this patent is extended or adjusted under 35 U.S.C. 154(b) by 0 days.

(21) Appl. No.: 16/867,460

(22) Filed: May 5, 2020

(65) Prior Publication Data

US 2021/0057938 A1    Feb. 25, 2021

Related U.S. Application Data

(60) Provisional application No. 62/889,162, filed on Aug. 20, 2019.

(51) Int. Cl.
*H02J 50/60* (2016.01)
*H02J 50/12* (2016.01)
*H01F 38/14* (2006.01)
*G01V 3/10* (2006.01)

(52) U.S. Cl.
CPC .............. *H02J 50/60* (2016.02); *G01V 3/10* (2013.01); *H01F 38/14* (2013.01); *H02J 50/12* (2016.02)

(58) Field of Classification Search
None
See application file for complete search history.

(56) References Cited

U.S. PATENT DOCUMENTS

| 9,106,083 B2 | 8/2015 | Partovi |
| 9,950,636 B2 | 4/2018 | Saito et al. |
| 10,027,183 B2 | 7/2018 | Miyamoto et al. |
| 10,254,427 B2 * | 4/2019 | Adachi ................... H01F 27/28 |
| 2016/0172891 A1 * | 6/2016 | Filippenko .......... H02J 7/00034 |
| | | 320/108 |
| 2017/0317536 A1 | 11/2017 | Marson et al. |

(Continued)

FOREIGN PATENT DOCUMENTS

| EP | 3836352 A1 * | 6/2021 | ............. H02J 50/10 |
| JP | 2012249401 A | 12/2012 | |

(Continued)

*Primary Examiner* — Daniel Kessie
*Assistant Examiner* — Terrence R Willoughby
(74) *Attorney, Agent, or Firm* — Treyz Law Group, P.C.; Jason Tsai

(57) ABSTRACT

A wireless power system has a wireless power transmitting device and a wireless power receiving device. The wireless power transmitting device may be a wireless charging mat or other device with one or more wireless power transmitting coils for transmitting wireless power signals. The wireless power receiving device may be a portable electronic device with one or more wireless power receiving coils for receiving the transmitted wireless power signals. The wireless power transmitting device may have foreign object detection coils. Q-factor measurements may be made on the transmitting coil during wireless power transmission and/or voltage measurements may be made using the foreign object detection coils to detect whether a foreign object is present. The foreign object detection coils may include overlapping coils with different winding patterns to enhance foreign object detection coverage.

18 Claims, 7 Drawing Sheets

(56) References Cited

U.S. PATENT DOCUMENTS

| | | | | |
|---|---|---|---|---|
| 2018/0026482 A1* | 1/2018 | Asano | ............... | H02J 50/12 |
| | | | | 307/104 |
| 2018/0048191 A1* | 2/2018 | Uramoto | ............ | H02J 50/40 |
| 2018/0166928 A1* | 6/2018 | Wu | ................ | H01F 38/14 |
| 2018/0323659 A1* | 11/2018 | Maniktala | ......... | G01V 3/104 |
| 2019/0027973 A1 | 1/2019 | Baek et al. | | |
| 2019/0225098 A1* | 7/2019 | Helm | ................ | B60K 1/04 |
| 2019/0280533 A1* | 9/2019 | Lee | .................. | G01V 3/087 |
| 2019/0348864 A1 | 11/2019 | Pinciuc et al. | | |
| 2019/0363588 A1* | 11/2019 | Daetwyler | ......... | B60L 53/124 |
| 2020/0200937 A1* | 6/2020 | Widmer | ............ | B60L 53/122 |
| 2022/0173624 A1* | 6/2022 | Draak | ............... | H02J 50/60 |

FOREIGN PATENT DOCUMENTS

| | | | |
|---|---|---|---|
| JP | 2017518018 A | 6/2017 | |
| JP | 6551694 B | 7/2019 | |

\* cited by examiner

WIRELESS POWER SYSTEM WITH OBJECT DETECTION

This application claims the benefit of provisional patent application No. 62/889,162, filed Aug. 20, 2019, which is hereby incorporated by reference herein in its entirety.

FIELD

This relates generally to power systems, and, more particularly, to wireless power systems for charging electronic devices.

BACKGROUND

In a wireless charging system, a wireless power transmitting device such as a charging mat wirelessly transmits power to a wireless power receiving device such as a portable electronic device. The portable electronic device has a coil and rectifier circuitry. The coil of the portable electronic device receives alternating-current wireless power signals from the wireless charging mat. The rectifier circuitry converts the received signals into direct-current power. To ensure satisfactory operation, the wireless charging system may have circuitry to detect foreign objects.

SUMMARY

A wireless power system has a wireless power transmitting device and a wireless power receiving device. The wireless power transmitting device may be a wireless charging mat or other device with one or more wireless power transmitting coils for transmitting wireless power signals. The wireless power receiving device may be a portable electronic device with one or more wireless power receiving coils for receiving the transmitted wireless power signals.

The wireless power transmitting device has foreign object detection coils of one or more winding types. Q-factor measurements may be made on a transmitting coil during wireless power transmission and/or magnetic field measurements may be made using the foreign object detection coils to detect whether a foreign object is present.

The foreign object detection coils may include overlapping coils of different types. For example, the foreign object detection coils may include a first set of coils with spiral windings and second set of coils with figure-eight windings. By overlapping the first coils and second coils, foreign object detection accuracy can be enhanced.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

Wireless power is transmitted from the wireless power transmitting device to the wireless power receiving device using one or more wireless power transmitting coils to charge a battery in the wireless power receiving device and/or to power other load circuitry. The wireless power receiving device has one or more wireless power receiving coils coupled to rectifier circuitry that converts received wireless power signals into direct-current power.

Figure 1:
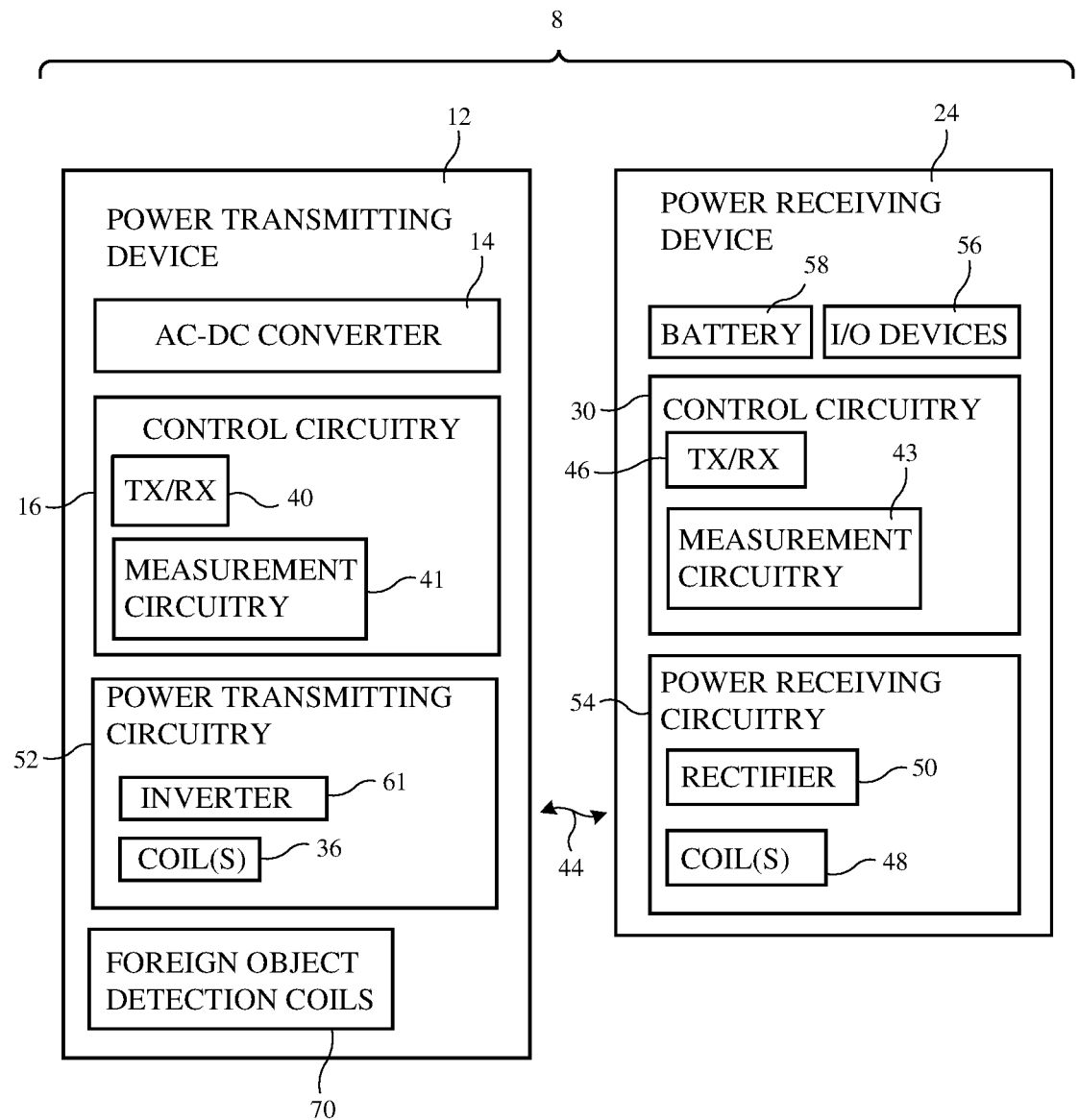
FIG. 1 is a schematic diagram of an illustrative wireless power system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data to detect foreign objects and perform other tasks, processing user input, handling negotiations between devices 12 and 24, sending and receiving in-band and out-of-band data, making measurements, and otherwise controlling the operation of system 8. In an illustrative configuration, the processing circuitry of device 12 uses foreign object detection coils to monitor for the presence of foreign objects such as coins, paper clips, credit cards, etc. and takes appropriate action (e.g., halting power transmission) in response to detecting that a foreign object is present.

Control circuitry in system 8 may be configured to perform operations in system 8 using hardware (e.g., dedicated hardware or circuitry), firmware and/or software.

Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat or charging puck that includes power adapter circuitry), may be a wireless charging mat or puck that is coupled to a power adapter or other equipment by a cable, may be a portable device, may be equipment that has been incorporated into furniture, a vehicle, or other system, may be a removable battery case, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 uses power transmitting circuitry 52 to transmit wireless power to power receiving circuitry 54 of device 24. Power transmitting circuitry 52 may have switching circuitry (e.g., inverter circuitry 61 formed from transistors) that is turned on and off based on control signals provided by control circuitry 16 to create AC current signals through one or more wireless power transmitting coils such as wireless power transmitting coils 36. These coil drive signals cause coil(s) 36 to transmit wireless power. Coils 36 may be arranged in a planar coil array (e.g., in configurations in which device 12 is a wireless charging mat) or may be arranged to form a cluster of coils (e.g., in configurations in which device 12 is a wireless charging puck). In some arrangements, device 12 (e.g., a charging mat, puck, etc.) may have only a single coil. In other arrangements, a wireless charging device may have multiple coils (e.g., two or more coils, 5-10 coils, at least 10 coils, 10-30 coils, fewer than 35 coils, fewer than 25 coils, or other suitable number of coils).

As the AC currents pass through one or more coils 36, alternating-current electromagnetic (e.g., magnetic) fields (wireless power signals 44) are produced that are received by one or more corresponding receiver coils such as coil(s) 48 in power receiving device 24. Device 24 may have a single coil 48, at least two coils 48, at least three coils 48, at least four coils 48, or other suitable number of coils 48. When the alternating-current electromagnetic fields are received by coil(s) 48, corresponding alternating-current currents are induced in coil(s) 48. Rectifier circuitry such as rectifier circuitry 50, which contains rectifying components such as synchronous rectification metal-oxide-semiconductor transistors arranged in a bridge network, converts received AC signals (received alternating-current signals associated with electromagnetic signals 44) from one or more coils 48 into DC voltage signals for powering device 24.

The DC voltage produced by rectifier circuitry 50 (sometime referred to as rectifier output voltage Vrect) can be used in charging a battery such as battery 58 and can be used in powering other components in device 24. For example, device 24 may include input-output devices 56 such as a display, touch sensor, communications circuits, audio components, sensors, light-emitting diode status indicators, other light-emitting and light detecting components, and other components and these components (which form a load for device 24) may be powered by the DC voltages produced by rectifier circuitry 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In-band transmissions between devices 12 and 24 may be performed using coils 36 and 48. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions.

It is desirable for power transmitting device 12 and power receiving device 24 to be able to communicate information such as received power, states of charge, and so forth, to control wireless power transfer. However, the above-described technology need not involve the transmission of personally identifiable information in order to function. Out of an abundance of caution, it is noted that to the extent that any implementation of this charging technology involves the use of personally identifiable information, implementers should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Control circuitry 16 has external object measurement circuitry 41 that may be used to detect external objects on the charging surface of device 12 (e.g., on the top of a charging mat or, if desired, to detect objects adjacent to the coupling surface of a charging puck). Circuitry 41 can detect foreign objects such as coils, paper clips, and other metallic objects and can detect the presence of wireless power receiving devices 24 (e.g., circuitry 41 can detect the presence of one or more coils 48). During object detection and characterization operations, external object measurement circuitry 41 can be used to make measurements on coils 36 and/or on foreign object detection coils 70 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator that can create impulses so that impulse responses can be measured to gather inductance information, Q-factor information, etc.) and signal detection circuitry (e.g., filters, analog-to-digital converters, impulse response measurement circuits, etc.). In some configurations, Q-factor measurements and other measurements may be made during wireless power transfer operations. Switching circuitry in device 12 may be used to switch desired coils into use during wireless power transmission and/or foreign object detection operations.

Measurement circuitry 43 in control circuitry 30 and/or measurement circuitry 41 in control circuitry 16 may be used in making current and voltage measurements. Based on this information or other information, control circuitry 30 can configure rectifier circuitry 50 to help enhance wireless power reception by coils 48.

Figure 2:
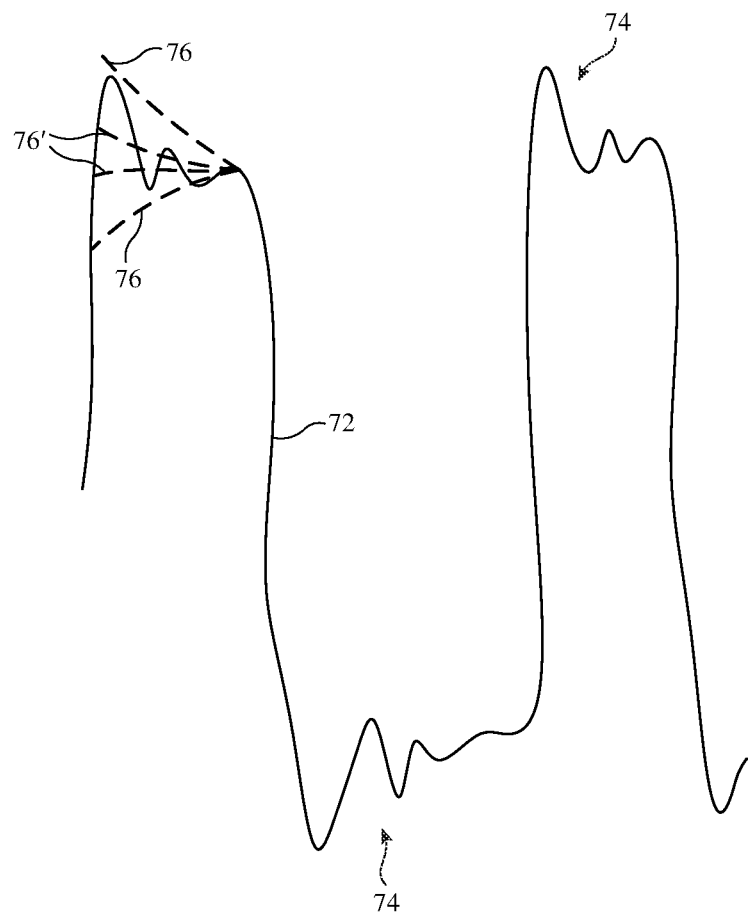
FIG. 2 is a graph of an illustrative wireless power transmitter signal in accordance with an embodiment.

FIG. 2 is a graph showing an illustrative wireless power transmitting signal during wireless power transmission. Wireless power transmitting coil signal 72 (e.g., coil voltage) is characterized by an alternating-current waveform that is established by inverter 61 as inverter 61 drives a wireless power transmission coil. In the example of FIG. 2, this waveform is a square wave. Other types of alternating-current (AC) waveforms may be supplied, if desired. The frequency of the AC drive signal may be 10 kHz to 1 MHz, at least 50 kHz, less than 300 kHz, or other suitable frequency.

As shown in FIG. 2, ringing 74 may be induced in wireless power transmitting coil signal 72 (e.g., ringing resulting from each square wave cycle of the AC drive signal and/or ringing resulting from impulses applied separately to the wireless power transmitting coil by control circuitry 16 during wireless power transmission). Using analog-to-digital converter circuitry, peak detection circuitry, envelope detection circuitry, and/or other measurement circuitry 41 in control circuitry 16, the magnitude and frequency of the ringing component of the wireless power transmitting coil signal and decay envelope 76 can be measured, thereby allowing coil parameters such as inductance L and Q factor to be measured. When no foreign object is present, the decay envelope may have a shape of the type shown by illustrative decay envelope 76 (as an example). When a foreign object is present, a damped response (see, e.g., damped envelope 76') may be exhibited.

Figure 3:
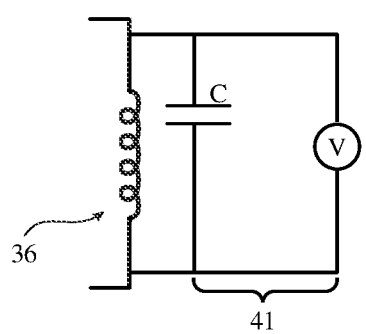
FIG. 3 is a circuit diagram showing illustrative measurement circuitry in a wireless power transmitter in accordance with an embodiment.

FIG. 3 is a circuit diagram of an illustrative transmitting coil circuit. As shown in FIG. 3, measurement circuitry 41 may have a voltage sensor that is configured to measure signal 72 (including the ringing portion of signal 72) on wireless power transmitting coil 36. The components of FIG. 3 (e.g., coil 36 and capacitor C) form a parallel resonant circuit which is tuned to a measurable frequency (e.g., a frequency of at least 0.2 MHz, at least 0.5 MHz, about 1 MHz, less than 2 MHz, less than 1.5 MHz, or other suitable frequency). Capacitor C may be used to reduce the frequency of ringing 74. The value of capacitor C may be at least 0.2 nF, at least 2 nF, 22 nF, less than 200 nF, less than 400 nF, or other suitable value. In the absence of capacitor C, the frequency of ringing 74 may be tens of MHz, which can pose measurement challenges. In the presence of capacitor C, which is coupled across coil 36, the frequency of ringing 74 may be reduced (e.g., to hundreds of kHz, 1 MHz, or other suitable frequency), thereby facilitating measurement of ringing 74 with measurement circuitry 41.

During operation, control circuitry 16 can use measurement circuitry 41 to measure coil characteristics such as Q factor (e.g., by measuring decay envelope 76) to determine whether a foreign object is present on coil 36. In the presence of foreign object s (e.g., metallic objects), wireless power signals will induce eddy currents in the foreign object that will create lowered values of Q factor. In response to detecting that the measured value of Q is less than a predetermined threshold (or using other suitable detection criteria), control circuitry 16 can conclude that a foreign object is likely present and can take appropriate action (e.g., by notifying a user of system 8, by halting wireless power transmission, by reducing the amount of power being transmitted to a relatively low level, etc.). The analysis of the ringing signal can take place during power transmission operations, so power transmission need not be interrupted to detect foreign objects.

Figure 4:
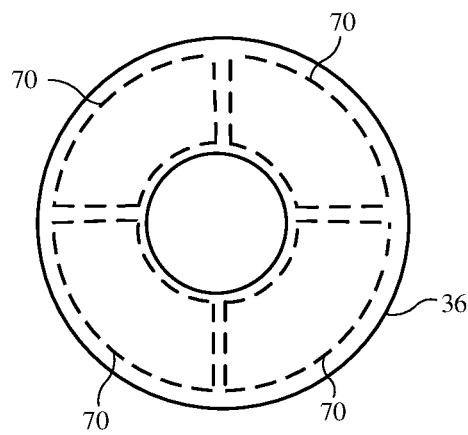
FIGS. 4, 5, 6, and 7 are diagrams of illustrative wireless power transmitter coils and foreign object detection coils in accordance with an embodiment.
Figure 5:
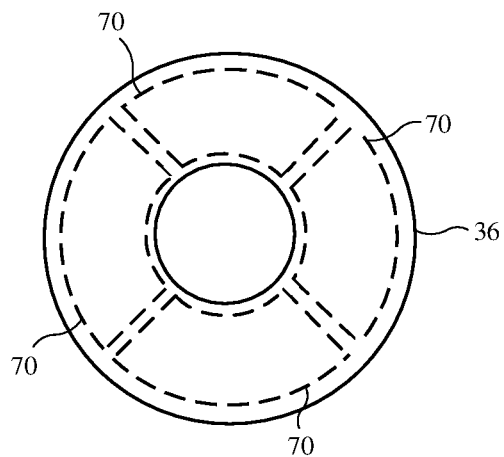
Figure 6:
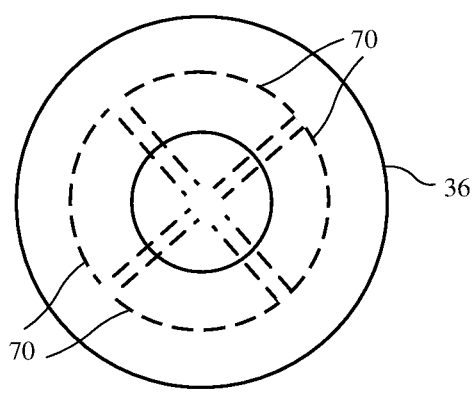
Figure 7:
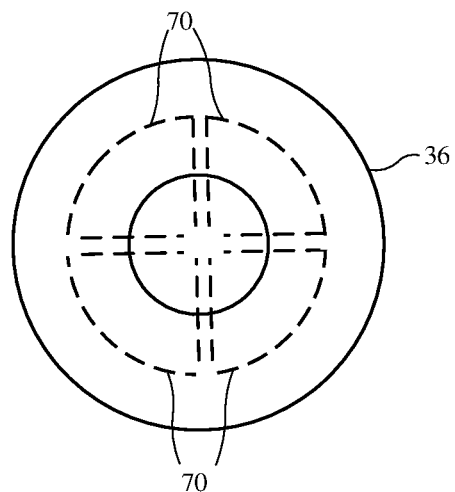

If desired, control circuitry 16 can detect foreign objects using foreign object detection coils 70. Coils 70 may be arranged to fully or partially overlap one or more of coils 36. FIGS. 4, 5, 6, and 7 show how coils 70 may include four overlapping layers of coils that are configured to provide foreign object detection for an overlapped transmitting coil 36. In the example of FIGS. 4 and 5, coils 70 form segments of a ring. The layout of coils 70 differs between FIG. 4 and to enhance detection sensitivity. In the example of FIGS. 6 and 7, coils 70 have the shape of circular sectors (e.g., wedges). The patterns of coils 70 in FIGS. 6 and 7 differ from each other and differ from the coil patterns of coils 70 in FIGS. 4 and 5 to create sensitivity in different areas and thereby enhance foreign object detection coverage. There are four layers of coils 70 and 16 coils 70 in total in the illustrative configuration of FIGS. 4, 5, 6, and 7. In general, there may be one layer of coils 70, at least two layers of coils 70, at least three layers of coils 70, at least four layers of coils 70, or other suitable number of foreign object detection coil layers. Coils 70 may be formed from signal lines such as metal traces on flexible printed circuit substrates and/or other substrates, metal wires, or other signal paths. In some configurations, coils 70 may include spiral coils and/or figure eight coils.

Figure 8:
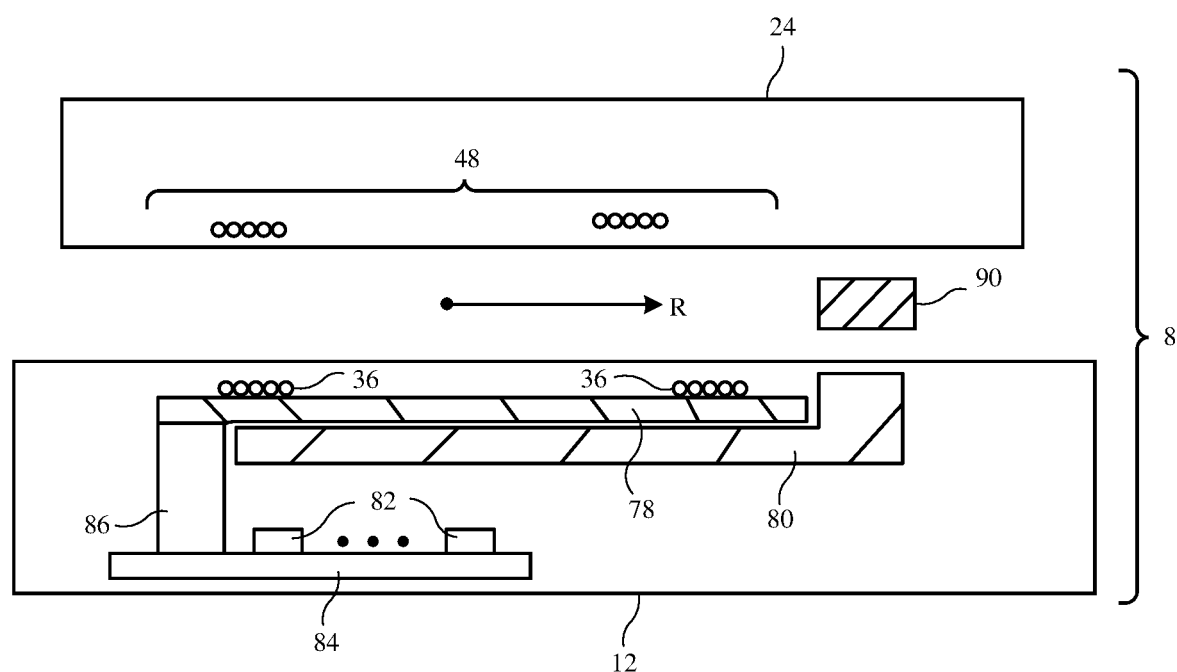
FIG. 8 is a cross-sectional side view of an illustrative wireless power system in accordance with an embodiment.

FIG. 8 is a cross-sectional side view of system 8. In the illustrative configuration of FIG. 8, device 12 has a single wireless power transmitting coil 36 that overlaps flexible printed circuit 78. A layer of magnetic material such as ferrite layer 80 may be overlapped by coil 36 and flexible printed circuit 78. Foreign object detection coils 70 are formed from metal traces in flexible printed circuit 78. Flexible printed circuit 78 is interposed between coil 36 and the layer of magnetic material (e.g., layer 80). Misalignment of wireless power receiving device 24 creates unbalance between detection coil voltages, which can, in some situations, mimic the appearance of a foreign object. By placing printed circuit 78 below coil(s) 36, printed circuit 78 and coils 70 are interposed between wireless power transmitting coil 36 and ferrite layer 80 to reduce sensitivity to misalignment of wireless power receiving device 24 with respect to wireless power transmitting coil 36.

The circuitry of device 12 may be formed from components 82 mounted to printed circuit 84. Connector 86 electrically couples the circuitry on printed circuit 84 to foreign object detection coils 70 in printed circuit 78. Wires (e.g., lengths of Litz wire) electrically couple inverter 61 to respective terminals of coil 36.

Foreign objects such as foreign object 90 may be located above coil 36 (e.g., at a distance R from the center of coil 36). Control circuitry 16 uses foreign object detection coils 70 to measure magnetic fields B to monitor for the presence of objects such as object 90.

To enhance detection sensitivity, foreign object detection coils 70 may include coils of different winding types. For example, some of coils 70 may have spiral winding patterns and some of coils 70 may have figure eight winding patterns. Each type of coil may exhibit different peaks and valleys in sensitivity to foreign objects, so by overlapping coils with different types of winding patterns, blind spots can be avoided.

Figure 9:
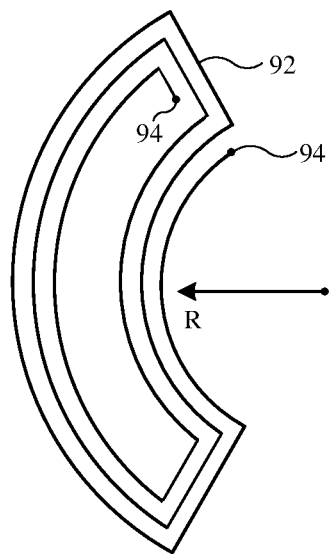
FIG. 9 is a diagram of an illustrative foreign object detection coil with a spiral winding in accordance with an embodiment.

FIG. 9 is an illustrative foreign object detection coil with a spiral winding. Conductive path (line) 92 of the winding of illustrative coil 70 of FIG. 9 has a spiral shape that fits within a desired coil outline. Coil 70 of FIG. 9 has the shape of a ring quarter segment. Distance (radius) R is associated with the distance from the center of coil 36. Wedge shaped coil shapes and other coil outlines may be used, if desired. Terminals 94 are coupled electrically to control circuitry 16 (e.g., measurement circuitry 41). During operation, changes in voltage ($\Delta V$) across terminals 94 are monitored by circuitry 41 to determine if foreign object 90 is present. There may be any suitable number of turns in the spiral coil winding of FIG. 9 (e.g., at least one, at least two, at least three, at least five, at least 10, fewer than 20, etc.).

Figure 10:
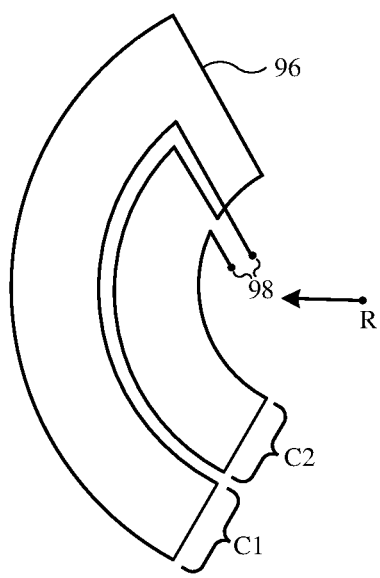
FIG. 10 is a diagram of an illustrative foreign object detection coil with a figure eight winding forming a pair of subcoils with respective clockwise and counterclockwise winding senses in accordance with an embodiment.

FIG. 10 is an illustrative foreign object detection coil with a figure eight winding. Conductive path (line) 96 of illustrative coil 70 of FIG. 10 has an outline with the shape of a ring quarter segment (as an example). The use of a common shape for coil 70 of FIG. 10 and coil 70 of FIG. 9 (e.g., matching coil outlines) allows coil 70 of FIG. 10 to overlap and match the outline of coil 70 of FIG. 9. Other shapes may be used, if desired (e.g., other shapes such as the wedge shapes of FIG. 6 or other shapes that match the shape of an overlapped spiral coil).

Conductive path 96 is coupled to measurement circuitry 41 by terminals 98. A first portion of coil 70 of FIG. 10 forms a first subcoil C1 with a first winding sense (e.g., clockwise), whereas a second portion of coil 70 of FIG. 10 forms a second subcoil C2 with a second winding sense (e.g., a clockwise winding sense). Because subcoils C1 and C2 have opposite winding senses, coil 70 of FIG. 10 tends to be sensitive to perturbations in lateral magnetic fields. This sensitivity is complementary to the sensitivity of coil 70 of FIG. 9, so by using both coil 70 of FIG. 9 and coil 70 of FIG. 10, foreign object detection blind spots are avoided. Coils C1 and/or C2 may each have a single turn (as shown in FIG. 10) and/or coil C1 and/or coil C2 may have two or more turns.

Figure 11:
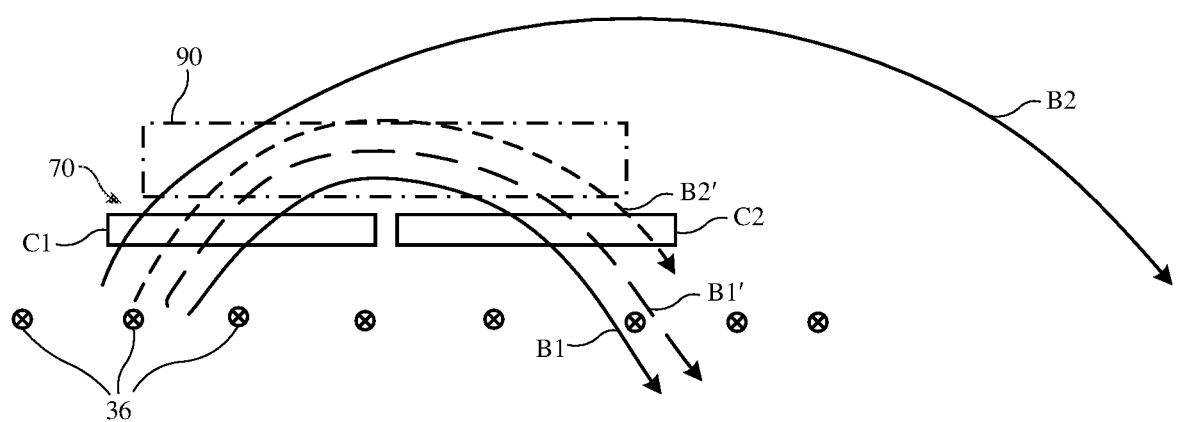
FIG. 11 is a cross-sectional side view of a portion of an illustrative wireless power transmitting coil and overlapping subcoils in a foreign object detection coil in accordance with an embodiment.

FIG. 11 is a diagram showing how coil 36 may produce lateral magnetic fields B1, B1', B2, and B2' during wireless power transmission. Figure-eight coil 70 has first subcoil C1 and second subcoil C2 in areas that overlap respective portions of coil 36 (e.g., coil 70 may have a quarter ring segment shape of the type shown in FIGS. 4 and 5). The behavior of the magnetic fields associated with coil 36 during operation depends on whether foreign object 90 is present. In the absence of object 90, coils 36 produce magnetic fields B1 and B2. Magnetic field B1 has a first portion that passes upwardly through coil C1 and a second portion that passes downwardly through coil C2. This induces two voltage contributions that add constructively to produce a resulting $\Delta V$ value at the terminals of coil 70. Magnetic field B2 passes through coil C1 but not through coil C2, so magnetic field B2 contributes less to the induced voltage $\Delta V$ in this example.

In the presence of a magnetic foreign object such as a paper clip formed from magnetic steel or another object formed from magnetic material (e.g., foreign object 90 of FIG. 11), magnetic fields are perturbed. In the example of FIG. 11, magnetic field B1 may follow the path of magnetic field B1' of FIG. 11 in the presence of foreign object 90, which induces a voltage similar to that induced in the absence of foreign object 90. On the other hand, magnetic field B2 now follows the path of magnetic field B2' of FIG. 11 because the magnetic material of foreign object 90 of FIG. 11 forms a bridge. As a result, magnetic field B2' passes upwardly through coil C1 and downwardly through coil C2 and therefore induces more voltage $\Delta V$ than magnetic field B2. Using measurement circuitry 41, circuitry 16 measures the difference in the value of $\Delta V$ resulting from the presence of object 90, thereby detecting when object 90 is present.

Figure 12:
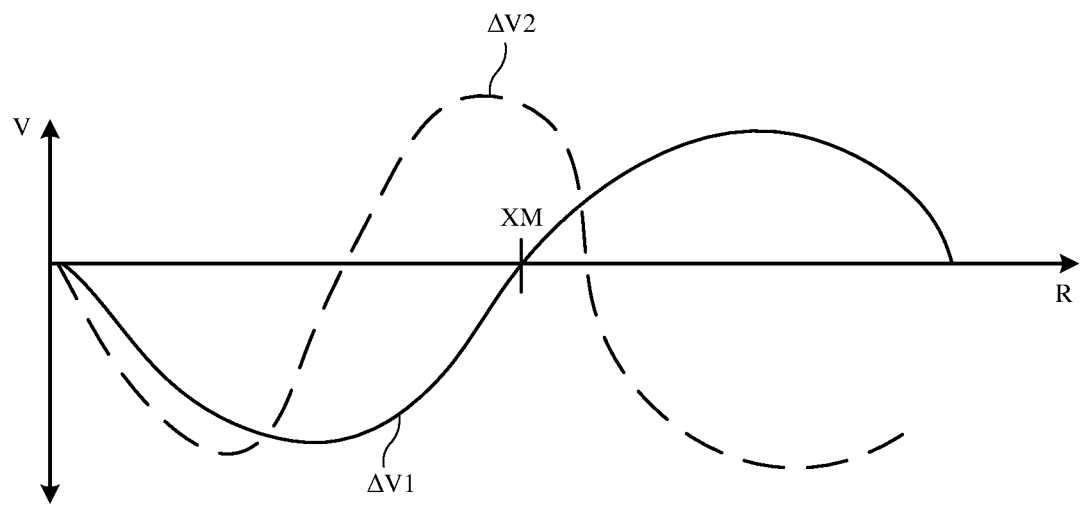
FIG. 12 is a graph showing potential output readings from overlapping spiral and figure eight foreign object detection coils as a function of foreign object location in accordance with an embodiment.

FIG. 12 is a graph illustrating the response ($\Delta V1$) of a spiral foreign object detection coil (e.g., coil 70 of FIG. 9) and the response ($\Delta V2$) of an overlapping figure eight coil having the same outline when a foreign object such as a magnetic foreign object is located at distance R from the center of coil 36. As shown by the graph, the spiral coil may exhibit a minimum sensitivity to the presence of foreign objects at distance XM. At this location, the figure eight coil has a maximum in sensitivity, so the responses of the coils with different winding patterns are complementary and detection blind spots are avoided. As this example demonstrates, the use of overlapping detection coils 70 helps device 12 detect magnetic foreign objects.

In the presence of a non-magnetic foreign object, the foreign object may perturb magnetic fields differently. In particular, instead of forming a bridge for magnetic fields as with a magnetic foreign object, a non-magnetic foreign object may tend to block magnetic flux. As a result, induced voltages in coils 70 for coils such as spiral and figure-eight shape coils will tend to be reduced relative to other coils in the group with no foreign object present. When flux is blocked in one part of the transmitter it is increased (net flux is still the same) through other sections (detection coils) whose voltages in this case are increased. But in the presence of a magnetic foreign object, flux is perturbed only around close proximity to the foreign object since it is bridged rather than blocked.

In the example of FIGS. 9, 10, 11, and 12, foreign object detection coils 70 include a first set of coils of a first type (e.g., a set of four or more spiral coils) and a second set of coils of a second type that is different than the first type (e.g., a set of four or more figure eight coils). These coils may have quarter-ring-segment shapes or other suitable shapes. Other types of coil 70 and/or other coil shapes may be used, if desired. The outlines of coils 70 may overlap completely or partly with each other and may overlap completely or partly with the windings of coil 36. The illustrative quarter ring segment coils 70 of FIGS. 4 and 5 completely overlap the windings of coil 36 (e.g., none of the windings of coils 70 fall outside of the footprint of coil 36), whereas the illustrative wedge shaped coils 70 of FIGS. 6 and 7 partially overlap the windings of coil 36 and partially overlap the empty center of ring-shaped coil 36. Coils 70 may include only one layer of coils (e.g., the coil layer of FIG. 4), may include only two layers of coils (e.g., a first layer with the pattern of FIG. 4 and spiral windings and a second layer with the pattern of FIG. 4 and matching figure-eight windings), may include three or more layers of coils, may include coil layers with different coil shapes and/or orientations (see, e.g., the layers of FIGS. 4, 5, 6, and 7), and/or may include other arrangements of coils.

The foregoing is merely illustrative and various modifications can be made to the described embodiments. The foregoing embodiments may be implemented individually or in any combination.

What is claimed is:

1. A wireless power transmitting device for transmitting wireless power to a wireless power receiving device, comprising:
    wireless power transmitting circuitry including a wireless power transmitting coil configured to transmit wireless power signals;
    a layer of magnetic material;
    printed circuit with metal traces forming foreign object detection coils of at least first and second different winding patterns overlapping the wireless power transmitting coil, wherein the printed circuit is interposed between the wireless power transmitting coil and the layer of magnetic material; and
    control circuitry configured to monitor for the presence of a foreign object using the foreign object detection coils.

2. The wireless power transmitting device of claim 1 wherein the first winding pattern comprises a spiral winding pattern.

3. The wireless power transmitting device of claim 2 wherein the second winding pattern comprises a figure eight winding pattern.

4. The wireless power transmitting device of claim 1 wherein there are only four foreign object detection coils of the first winding pattern formed in a first layer.

5. The wireless power transmitting device of claim 4 wherein there are only four foreign object detection coils of the second winding pattern formed in a second layer.

6. The wireless power transmitting device of claim 5 wherein the first winding pattern comprises one or more spiral coil winding pattern(s) and wherein the second winding pattern comprises one or more figure eight winding pattern(s).

7. The wireless power transmitting device of claim 6 wherein each of the foreign object detection coils has a ring-quarter-segment outline.

8. The wireless power transmitting device of claim 7 wherein the foreign object detection coils of the first winding pattern overlap the foreign object detection coils of the second winding pattern.

9. The wireless power transmitting device of claim 8 wherein the foreign object detection coils in the first layer overlap with the wireless power transmitting coil and do not overlap a central opening in the wireless power transmitting coil.

10. The wireless power transmitting device of claim 1 wherein each of the foreign object detection coils of the first winding pattern in the first layer overlaps and shares a common shape with a respective one of the foreign object detection coils of the second winding pattern in the second layer.

11. The wireless power transmitting device of claim 1 wherein:
    the foreign object detection coils of the first winding pattern are formed in a first layer and have a first orientation; and
    the foreign object detection coils of the second winding pattern are formed in a second layer and have a second orientation different than the first orientation.

12. The wireless power transmitting device of claim 11 wherein the foreign object detection coils further comprise foreign object detection coils formed in a third layer and foreign object detection coils formed in a fourth layer, wherein the foreign object detection coils in the first layer have a first shape, wherein the foreign object detection coils in the second layer have the first shape, wherein the foreign object detection coils in the third layer have a second shape different than the first shape, and wherein the foreign object detection coils in the fourth layer have the second shape.

13. The wireless power transmitting device of claim 12 wherein the foreign object detection coils in the first, second, third, and fourth layers comprise 16 total foreign object detection coils.

14. The wireless power transmitting device of claim 1 wherein the foreign object detection coils of the first winding pattern comprise wedge shaped coils and wherein the foreign object detection coils of the second winding pattern comprise ring segment shaped coils.

15. The wireless power transmitting device of claim 1 wherein the foreign object detection coils of the first and second winding patterns comprise wedge shaped coils.

16. The wireless power transmitting device of claim 1 wherein the foreign object detection coils of the first and second winding patterns comprise ring segment shaped coils.

17. A wireless power transmitting device for transmitting wireless power to a wireless power receiving device, comprising:
    wireless power transmitting circuitry including a wireless power transmitting coil configured to transmit wireless power signals;
    a layer of magnetic material; and
    printed circuit with metal traces forming a spiral-winding foreign object detection coil with a spiral winding pattern and a figure-eight-winding foreign object detection coil with a figure-eight winding pattern, wherein the printed circuit is interposed between the wireless power transmitting coil and the layer of magnetic material.

18. The wireless power transmitting device of claim 17 wherein the printed circuit is interposed between the wireless power transmitting coil and the layer of magnetic material to reduce sensitivity to misalignment of the wireless power receiving device with respect to the wireless power transmitting coil.

* * * * *